United States Patent
Zhou et al.

(10) Patent No.: US 12,374,357 B1
(45) Date of Patent: Jul. 29, 2025

(54) HEAT-ASSISTED MAGNETIC RECORDING HEAD WITH A SOLID IMMERSION MIRROR

(71) Applicant: SEAGATE TECHNOLOGY LLC, Fremont, CA (US)

(72) Inventors: Nan Zhou, Chanhassen, MN (US); Michael A. Seigler, Eden Prairie, MN (US); Chubing Peng, Eden Prairie, MN (US); YongJun Zhao, Eden Prairie, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 18/611,190

(22) Filed: Mar. 20, 2024

Related U.S. Application Data

(60) Provisional application No. 63/493,189, filed on Mar. 30, 2023.

(51) Int. Cl.
| | | |
|---|---|---|
| *G11B 5/00* | (2006.01) | |
| *G11B 5/48* | (2006.01) | |
| *G11B 7/1387* | (2012.01) | |

(52) U.S. Cl.
CPC .......... *G11B 5/4866* (2013.01); *G11B 7/1387* (2013.01); *G11B 2005/0021* (2013.01)

(58) Field of Classification Search
CPC ......... G11B 13/08; G11B 5/012; G11B 27/36; G11B 5/314; G11B 2005/0021; G11B 5/3306

USPC .......................................................... 360/59
See application file for complete search history.

(56) References Cited

U.S. PATENT DOCUMENTS

| | | | |
|---|---|---|---|
| 9,852,753 | B2 | 12/2017 | Peng |
| 9,911,441 | B1 | 3/2018 | Jandric |
| 9,934,800 | B1 | 4/2018 | Neira |
| 10,115,423 | B1 | 10/2018 | Gubbins |
| 10,249,326 | B1 | 4/2019 | Peng |
| 10,360,939 | B2 | 7/2019 | Krichevsky |
| 10,964,340 | B1 * | 3/2021 | Chen .................. E04D 13/1415 |
| 11,664,051 | B1 | 5/2023 | Zhou |
| 11,823,719 | B1 | 11/2023 | Peng |
| 2004/0001421 | A1 | 1/2004 | Tawa |
| 2006/0133230 | A1 | 6/2006 | Buechel |
| 2010/0123967 | A1 | 5/2010 | Batra |
| 2010/0214685 | A1 | 8/2010 | Seigler |

(Continued)

*Primary Examiner* — Nabil Z Hindi
(74) *Attorney, Agent, or Firm* — Mueting Raasch Group

(57) ABSTRACT

A heat-assisted magnetic recording head includes a near-field transducer, a waveguide, and a solid immersion mirror. The near-field transducer is configured to focus and emit an optical near-field. The waveguide is configured to receive electromagnetic radiation and propagate the electromagnetic radiation toward and proximal to the near-field transducer. The solid immersion mirror is disposed proximal to the near-field transducer and along a media-facing surface of the heat-assisted magnetic recording head. The solid immersion mirror includes a first segment and a second segment disposed on opposite sides of the near-field transducer relative to a cross-track dimension of the heat-assisted magnetic recording head. The solid immersion mirror includes a thermally robust metal having a melting temperature of at least 1500 degrees Celsius. The thermally robust metal is a primary material of the solid immersion mirror.

18 Claims, 5 Drawing Sheets

(56) References Cited

U.S. PATENT DOCUMENTS

2013/0058370 A1    3/2013    Chang-Hasnain
2017/0249962 A1    8/2017    Peng
2018/0096702 A1    4/2018    Staffaroni

* cited by examiner

HEAT-ASSISTED MAGNETIC RECORDING HEAD WITH A SOLID IMMERSION MIRROR

RELATED PATENT DOCUMENTS

This application claims the benefit of U.S. Provisional Application No. 63/493,189, filed on Mar. 30, 2023, which is incorporated herein by reference in its entirety.

TECHNICAL FIELD

The disclosure relates to a heat-assisted magnetic recording head of a hard disk drive.

BACKGROUND

Some hard disk drives (HDDs) utilize heat-assisted magnetic recording (HAMR) to increase the areal density of the HDD. A recording head of a HAMR HDD (hereafter, a HAMR head) typically includes a laser, a near-field transducer (NFT), and a write pole. The laser emits electromagnetic radiation that resonates with free electrons of the NFT to excite localized surface plasmons (LSPs) on the NFT. The NFT is configured to emit a near-field of the LSPs. The near-field briefly heats a small spot on a surface of a magnetic disk of the HDD. Some features of the HAMR head that are near the NFT may include materials that degrade under excess thermal exposure. Heat generated during operation of the HAMR head may degrade these materials, potentially reducing the lifetime of the HAMR head. Additionally, extraneous magnetic fields, for example those from adjacent tracks of a magnetic disk, may degrade the write capability of the HAMR head.

SUMMARY

The present disclosure describes a heat-assisted magnetic recording (HAMR) head having a solid immersion mirror disposed proximal to a near-field transducer (NFT) and along a media-facing surface of the HAMR head. The solid immersion mirror may be configured to improve localized surface plasmon (LSP) coupling efficiency and reduce required laser power by blocking scattered incident photons from a source (e.g., the laser), by blocking photons from reaching external surfaces such as a surface of a magnetic disk, and/or by reducing reflection from surfaces such as a media-facing surface, among other functions.

In some examples of this disclosure, a solid immersion mirror includes a thermally robust metal that is a primary metal of the solid immersion mirror. Utilizing a thermally robust metal instead of another metal (e.g., gold) as a primary metal of the solid immersion mirror may reduce thermally related degradation and/or defect formation in the solid immersion mirror, potentially extending the lifetime of the HAMR head. Additionally, a solid immersion mirror that includes a thermally robust primary metal may demonstrate lower deformation (e.g., protrusion, recession) along a media-facing surface of the HAMR head, enabling the solid immersion to be extended closer to the media-facing surface and potentially improving optical coupling and LSP generation on the NFT.

In some examples of this disclosure, a solid immersion mirror includes a magnetic material. Utilizing a magnetic material in the solid immersion mirror may enable advantageous magnetic and optical-magnetic designs of the solid immersion mirror, such as those that provide shielding against extraneous magnetic fields (e.g., from bits of data on adjacent tracks of a magnetic disk). Such designs have the potential to improve write capability of the HAMR head.

In one example, a heat-assisted magnetic recording head includes a near-field transducer configured to focus and emit an optical near-field; a waveguide configured to receive electromagnetic radiation and propagate the electromagnetic radiation toward and proximal to the near-field transducer; and a solid immersion mirror disposed proximal to the near-field transducer and along a media-facing surface of the heat-assisted magnetic recording head, wherein the solid immersion mirror includes a first segment and a second segment disposed on opposite sides of the near-field transducer relative to a cross-track dimension of the heat-assisted magnetic recording head, wherein the solid immersion mirror includes a thermally robust metal having a melting temperature of at least 1500° C., and wherein the thermally robust metal is a primary material of the solid immersion mirror.

In another example, a heat-assisted magnetic recording head includes a near-field transducer configured to focus and emit an optical near-field; a waveguide configured to receive electromagnetic radiation and propagate the electromagnetic radiation toward and proximal to the near-field transducer; and a solid immersion mirror disposed proximal to the near-field transducer and along a media-facing surface of the heat-assisted magnetic recording head, wherein the solid immersion mirror includes a first segment and a second segment disposed on opposite sides of the near-field transducer relative to a cross-track dimension of the heat-assisted magnetic recording head, and wherein the solid immersion mirror includes a magnetic material.

These and other features and aspects of various examples may be understood in view of the following detailed discussion and accompanying drawings.

DETAILED DESCRIPTION

Figure 1:
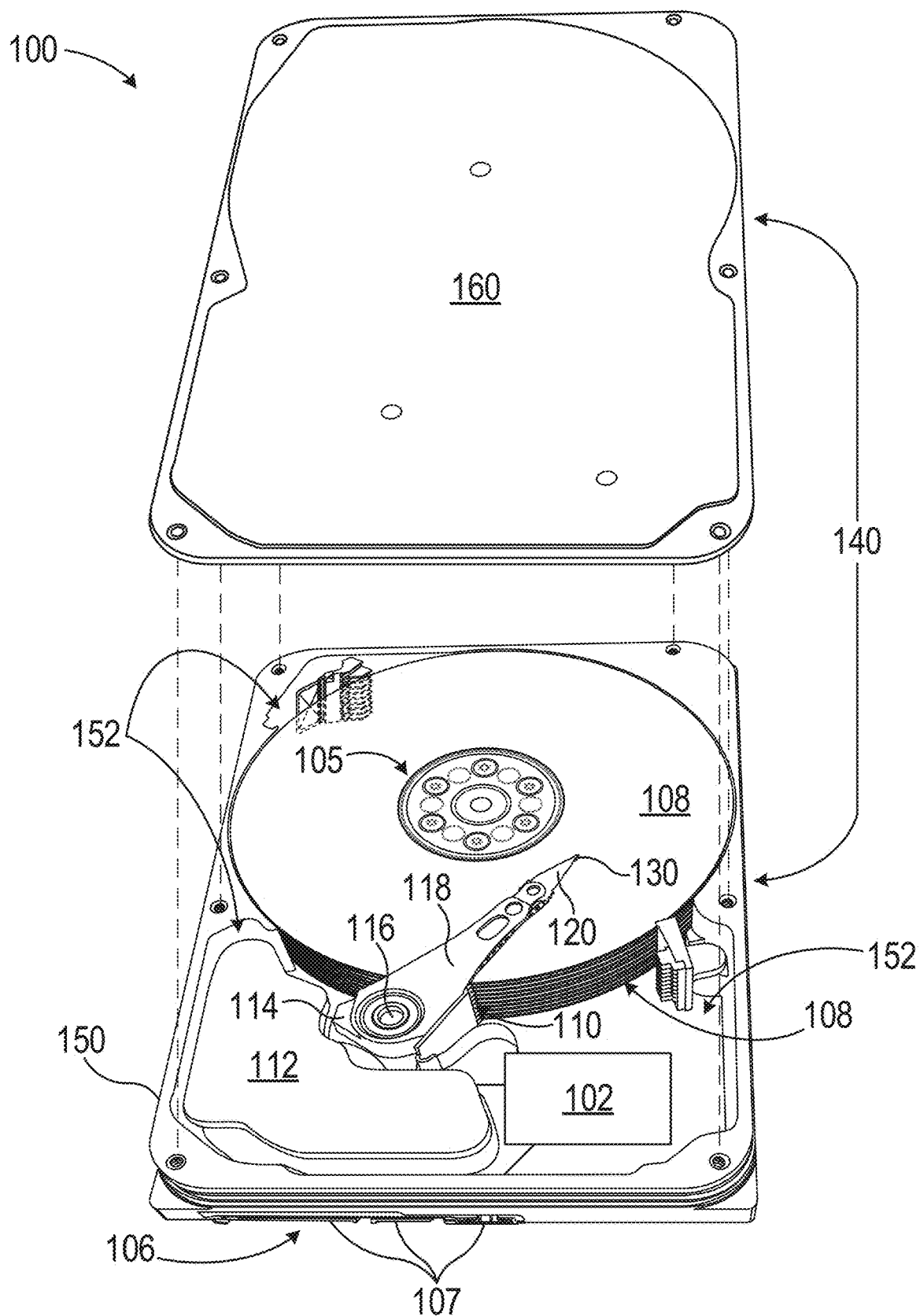
FIG. 1 is a perspective view of an example hard disk drive, in accordance with aspects of this disclosure.

FIG. 1 is a perspective view of an example hard disk drive, in accordance with aspects of this disclosure. HDD 100 includes an enclosure 140 configured to contain components of HDD 100. Enclosure 140 includes a base 150 and a top cover 160. Base 150 includes a recess 152 to accommodate components of HDD 100. HDD 100 further includes a printed circuit board assembly (PCBA) 106. PCBA 106 of this example is coupled to base 150 and includes a plurality of input/output connectors 107 that are each configured to provide an interface between one or more components of HDD 100 and one or more host devices (e.g., a computer, a server, a consumer electronic device, etc.). HDD 100 may include a drive controller 102 that is configured to control components and drive operations of HDD 100 by receiving commands (e.g., read commands and write commands) from the host device(s). Examples of drive controller 102 include a digital signal processor (DSP), a processor or microprocessor, an application specific integrated circuit (ASIC), a field programmable gate array (FPGA), and a system on a chip (SoC), among others. While illustrated as a single controller, the functionality of drive controller 102 may in some examples be performed by a combination of controllers.

Base 150 may be formed from any suitable material, such as metal (e.g., aluminum), plastic, or other suitable material or combinations thereof. In some examples, base 150 comprises multiple components, such as an outer frame and a bottom cover, that are coupled together (e.g., by screws, by welding). Top cover 160 is configured to couple to base 150 to enclose components of HDD 100. Top cover 160 can be coupled to base 150 using any suitable technique, such as using one or more screws, connection fingers, locking/clipping structures, adhesives, rivets, other mechanical fasteners, welding (e.g., ultrasonic welding) or combinations thereof. Components other than those illustrated or specifically identified in FIG. 1 and described herein are contemplated and may be enclosed by base 150 and top cover 160.

HDD 100 includes a head stack assembly (HSA) 110 and one or more magnetic disks 108 configured to store bits of data. HSA 110 includes a plurality of head gimbal assemblies (HGA) 120. Each HGA 120 includes a magnetic recording head 130. Each magnetic recording head 130 is configured to read data from and write data to a surface of a magnetic disk 108. Each magnetic recording head 130 includes a reader and a writer. Other components of a magnetic recording head 130 (e.g., heaters, heat sinks, piezoelectric actuators) are contemplated. HDD 100 of FIG. 1 may be a heat-assisted magnetic recording (HAMR) HDD. In the example of a HAMR HDD, a magnetic recording head 130 may be a heat-assisted magnetic recording (HAMR) head and may include a light source such as a laser, a waveguide, and a near-field transducer (NFT) that is configured to heat and lower the coercivity of magnetic grains in a spot of focus on a magnetic disk 108.

A motor assembly 105 is configured to rotatably support magnetic disks 108 and circumferentially rotate magnetic disks 108 about an axis of rotation during operations of HDD 100. Magnetic disks 108 are mounted on motor assembly 105 such that an annular volume of each magnetic disk 108 encircles a portion of motor assembly 105. Motor assembly 105 may rotate magnetic disks 108 during an operation of HDD 100 such that each magnetic disk 108 moves relative to a respective magnetic recording head 130 to enable the magnetic recording head 130 to read data from and/or write data to the magnetic disk 108.

A voice coil drive actuator 112 produces a magnetic field that exerts a force on an actuator mechanism 114, causing actuator mechanism 114 to rotate about a shaft 116 in either rotational direction. Rotatable drive actuator arms 118 are mechanically coupled to actuator mechanism 114 and to each HGA 120 such that rotating actuator mechanism 114 causes rotatable drive actuator arms 118 and HGAs 120, and thus magnetic recording heads 130, to move relative to magnetic disks 108. While HDD 100 utilizes voice coil drive actuator 112 to move HGAs 120 relative to magnetic disks 108, other means of moving HGAs 120, such as a voice coil motor (VCM) or ultrasonic motor (USM), are contemplated.

Figure 2:
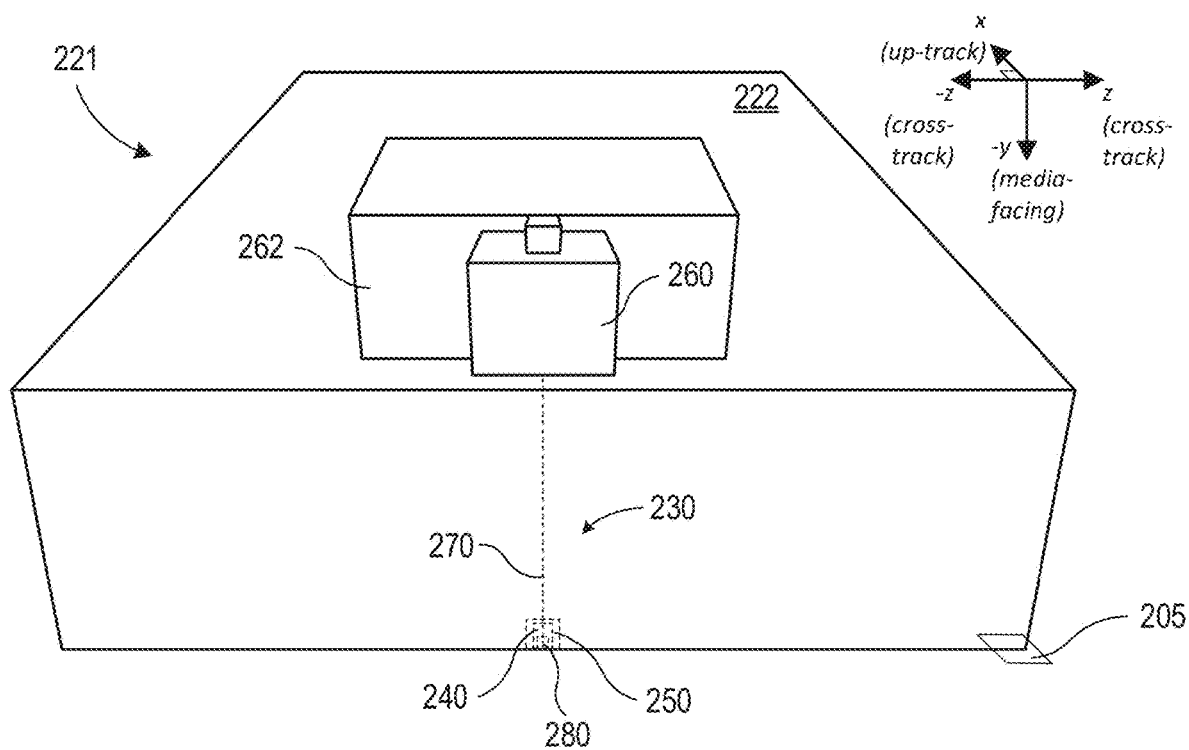
FIG. 2 is a perspective view of an example slider, in accordance with aspects of this disclosure.

FIG. 2 is a perspective view of an example slider 221, in accordance with aspects of this disclosure. Slider 221 may be an example of a slider 121 of FIG. 1. In the example of FIG. 2, slider 221 includes a slider body 222, a laser 260, and a submount 262.

Slider body 222 is configured to contain components of a HAMR head 230. Slider body 222 may include a segment of a wafer that components of HAMR head 230 are fabricated on (e.g., an aluminum titanium carbide wafer). HAMR head 230 is configured to read data from and write data to a surface of a magnetic disk (e.g., a magnetic disk 108 of FIG. 1).

Components of HAMR head 230 of FIG. 2 include a reader 240, a writer 250, a waveguide 270, and a near-field transducer (NFT) 280. HAMR head 230 may include other components that are not included in this view (e.g., heaters, heat sinks). Some features or parts of features of components of HAMR head 230 (e.g., reader 240, writer 250, NFT 280) may be presented on a media-facing surface 205 of slider body 222. Slider 221, and thus components of HAMR head 230, may be maintained at an approximate spacing (e.g., a head-media spacing) from a surface of the magnetic disk during some operations of HDD 100 (e.g., read operations, write operations). During such operations, media-facing surface 205 faces and is held proximate to the moving surface of the magnetic disk by a cushion of gas, known as an active air bearing (AAB), that is produced from a dynamic flow of gas across a pattern of recessed sub-surfaces bound within the volume of slider body 222.

Reader 240 is configured to generate a signal (e.g., a voltage change) in response to magnetic flux changes from bits of data on a magnetic disk (e.g., a magnetic disk 108 of FIG. 1). Reading of data from a magnetic disk by reader 240 may take place during a read operation (e.g., a read operation of HDD 100).

Writer 250 is configured to generate a magnetic field in response to a current passed through a writer coil of writer 250. Writer 250 may direct the magnetic field toward a magnetic disk to write bits of data on the magnetic disk (e.g., during a write operation of HDD 100, for later retrieval by reader 240 during a read operation of HDD 100).

Laser 260 is configured to emit electromagnetic radiation. Laser 260 may, for example, emit electromagnetic radiation having a wavelength in the near infrared range (e.g., approximately 830 nm), visible range, short wavelength infrared range, or other electromagnetic wavelength range. Examples of laser 260 include an optically pumped semiconductor laser, a quantum well laser, an integrated laser, or other suitable laser. Laser 260 of this example may be configured as an edge emitting laser (EEL), vertical cavity surface emitting laser (VCSEL), or other type of laser. Other example HAMR heads may include other types of light sources such as light emitting diodes (LEDs) and surface emitting diodes.

Laser 260 of FIG. 2 is coupled to slider body 222 via submount 262. In the example of FIG. 2, laser 260 and submount 262 are located on a face of slider body 222 that is opposite to media-facing surface 205. In some examples, a laser may be directly mounted to slider body 222. In some examples, a laser may be integrated into slider body 222. For example, a laser may be fabricated and integrated into slider body 222 through on-wafer laser (OWL) processing. Steps of OWL processing may include the growth of an epitaxial layer or stack on a donor substrate, patterning of the epitaxial layer or stack on the donor substrate, transfer of the patterned epitaxial layer or stack from the donor substrate to a wafer on which HAMR head 230 is being fabricated (e.g., a wafer that includes some components of HAMR head 230 that have already been fabricated), and further processing of the epitaxial layer or stack to form the final profile and features of the laser.

Waveguide 270 is configured to receive electromagnetic radiation that laser 260 emits and propagate the electromagnetic radiation toward and proximal to NFT 280. Waveguide 270 may include a material or materials that facilitate the propagation of electromagnetic radiation from laser 260 toward NFT 280. In some examples, waveguide 270 includes a material having a high refractive index (e.g., greater than 1.5) and that is optically transparent at the wavelength of the electromagnetic radiation from laser 260. In some examples, waveguide 270 includes niobium oxide. In some examples, waveguide 270 includes multiple optical layers. Waveguide 270, for example, may include a waveguide core and one or more cladding layers. In some examples, a waveguide core includes a dielectric material (e.g., niobium oxide, tantalum oxide) and a cladding layer includes another, different dielectric material (e.g., aluminum oxide, silicon dioxide).

Waveguide 270 is formed integrally within slider body 222. Submount 262 may be configured to redirect electromagnetic radiation output from laser 260 so that the electromagnetic radiation is directed through waveguide 270 in the negative y-direction of FIG. 2 (e.g., toward NFT 280). The path between laser 260 and waveguide 270 may include one or more optical couplers, mode converters, and/or mode couplers. Waveguide 270 may include mode converters. In examples where a laser is integrated into slider body 222 (e.g., OWL processing), waveguide 270 may include one or more bends or curvatures to enable propagation of electromagnetic radiation from the integrated laser toward NFT 280.

Electromagnetic radiation that laser 260 emits and waveguide 270 propagates toward NFT 280 may couple to free electrons of NFT 280 (e.g., through resonance coupling) and produce localized surface plasmons (LSPs) on NFT 280. NFT 280 is configured to focus and emit an optical near-field of LSPs, for example a distribution of LSPs that are excited on NFT 280 through coupling with electromagnetic radiation from waveguide 270. NFT 280 may focus and emit an optical near-field on a small spot on a magnetic disk surface that is proximal to HAMR head 230 (e.g., a magnetic disk 108 of FIG. 1). Energy of an emitted optical near-field may heat and lower the coercivity of magnetic grains in the spot of focus on the magnetic disk, thereby enabling a magnetic field from writer 250 to orient magnetic moments of the magnetic grains and thus enabling writing of bits of data on the magnetic disk.

Figure 3:
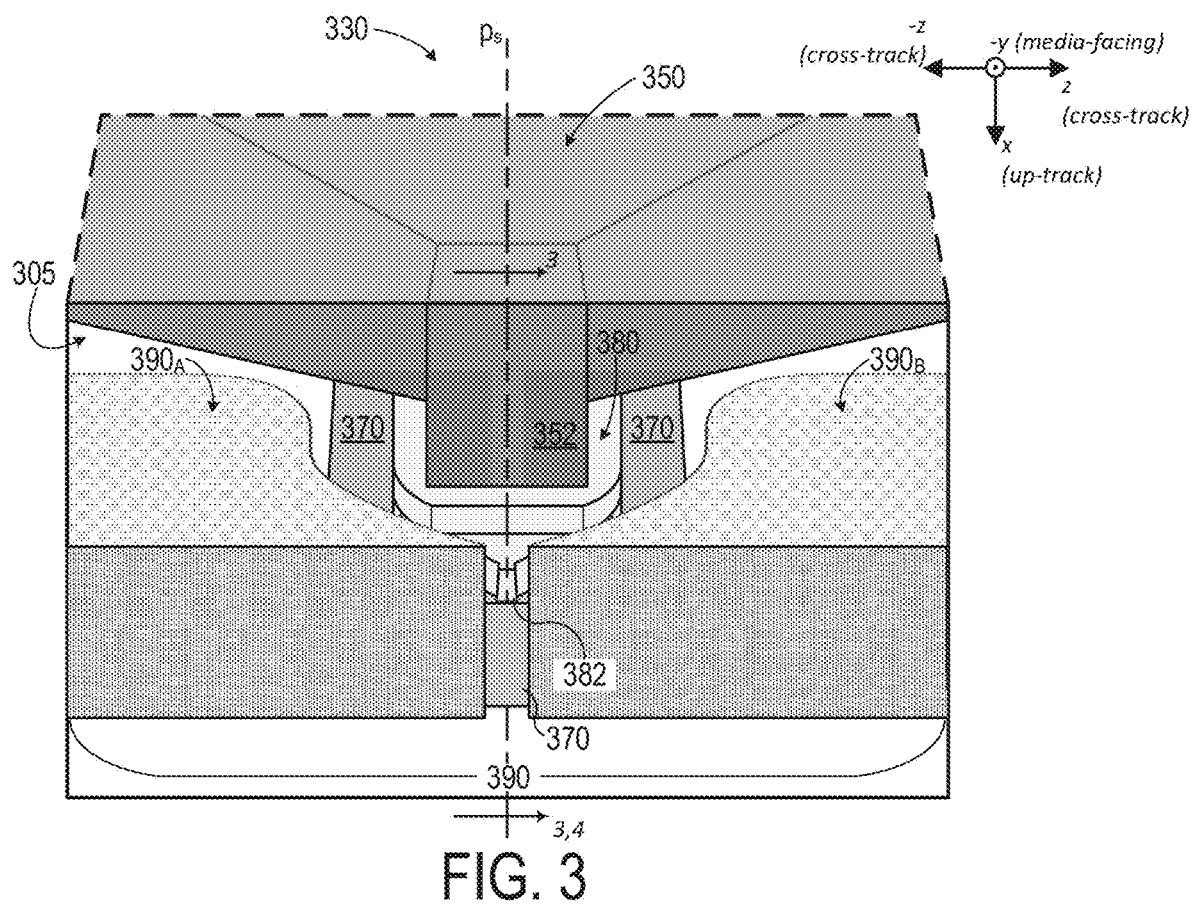
FIG. 3 is a perspective view of an example HAMR head, in accordance with aspects of this disclosure.

FIG. 3 is a perspective view of an example HAMR head, in accordance with aspects of this disclosure. HAMR head 330 of FIG. 3 may be an example of HAMR head 230 of FIG. 2. HAMR head 330 includes a writer 350, a waveguide 370, an NFT 380, and a solid immersion mirror 390.

Writer 350 includes a write pole 352 that is configured to focus and direct magnetic flux that writer 350 generates. In the example of HAMR head 330 of FIG. 3, a portion of write pole 352 is provided on a media-facing surface 305 of HAMR head 330. Media-facing surface 305 may face and be held proximate to a moving surface of a magnetic disk during write operations of an HDD (e.g., HDD 100 of FIG. 1), enabling magnetic flux from write pole 352 to be directed toward the surface of the magnetic disk.

FIG. 3 illustrates an end of waveguide 370 that is proximal to NFT 380. Waveguide 370 may propagate electromagnetic radiation (e.g., from laser 260 of FIG. 2) toward and proximal to NFT 380. The end of waveguide 370 that is illustrated in FIG. 3 may be a location of coupling between electromagnetic radiation in waveguide 370 and free electrons in NFT 380. NFT 380 is disposed between writer 350 and waveguide 370. In some examples, NFT 380 is coupled to waveguide 370, for example to a cladding layer of waveguide 370. In some examples, a layer of material may be disposed between NFT 380 and a waveguide core of waveguide 370, for example a material having a different refractive index than the waveguide core of waveguide 370. In some examples, a feature or features such as a grating may be included and disposed between NFT 380 and waveguide 370. Such materials and/or features may be included to promote coupling between electromagnetic radiation in waveguide 370 and free electrons of NFT 380.

NFT 380 may include a plasmonic metal. As used herein, a plasmonic metal is a metal that possesses properties (e.g., electrical properties, optical properties) that promote resonance coupling between photons incident upon the plasmonic metal and free electrons of the plasmonic metal. Examples of plasmonic metals include gold, silver, ruthenium, copper, aluminum, and rhodium, among others. NFT 380 may include an alloy that includes a plasmonic metal. In some examples, NFT 380 includes a plasmonic metal and a noble metal (e.g., palladium, osmium, iridium, or platinum).

NFT 380 may have specific properties and/or features (e.g., shape, dimensions, physical features) that promote and enhance the processes of exciting LSP modes. For example, NFT 380 may have a shape and dimensions that promote resonance between electromagnetic radiation and free electrons to excite a specific plasmonic mode or modes. In some examples, NFT 380 includes a feature or features that support the emission of a near-field. A peg 382 of NFT 380, for example, is a narrow protrusion from NFT 380 that is disposed proximal to media-facing surface 305 and is configured to amplify and focus a near-field that NFT 380 emits. In some instances, one or more portions of peg 382 are exposed on media-facing surface 305.

Solid immersion mirror 390 may be configured to improve LSP coupling efficiency and reduce required laser power by blocking scattered incident photons from a source (e.g., laser 260 of FIG. 2), by blocking photons from reaching external surfaces such as a surface of a magnetic disk, and/or by reducing reflection from surfaces such as media-facing surface 305, among other functions. Solid immersion mirror 390 may be referred to by other names, such as a miniature solid immersion mirror (mini-SIM or mSIM) or subwavelength mirror.

Solid immersion mirror 390 is disposed proximal to NFT 380 and along media-facing surface 305. Solid immersion mirror 390 includes a first segment $390_A$ and a second segment $390_B$. Segments $390_A$ and $390_B$ are disposed on opposite sides of NFT 380 relative to a cross-track dimension z of HAMR head 330. NFT 380 is divided into substantially symmetric halves by a plane of symmetry $p_s$ that is substantially parallel to a media-facing -y dimension and up-track x dimension of HAMR head 330. First segment $390_A$ and second segment $390_B$ may be substantially symmetric about plane of symmetry $p_s$.

In accordance with aspects of this disclosure, solid immersion mirror 390 may include a thermally robust metal that is a primary material of solid immersion mirror 390. Examples of thermally robust metals include metals having a high melting temperature, such as a melting temperature of at least 1500° C. In some examples, a thermally robust metal has a melting temperature of at least 1800° C. In some examples, a thermally robust metal has a melting temperature of at least 2200° C. As used herein the term "primary material" refers to a material that is present in a feature in an amount (e.g., atomic percentage or weight percentage) that is greater than any other material that is also present in the same feature. The thermally robust metal may, for example, constitute greater than 50 atomic percent of solid immersion mirror 390. In some examples, the thermally robust metal constitutes at least 95 atomic percent of solid immersion mirror 390 (e.g., 95%, 99%, 99.9%).

Utilizing a thermally robust metal instead of another metal (e.g., gold) as a primary material of solid immersion mirror 390 may reduce thermally related degradation and/or defect formation in solid immersion mirror 390, potentially extending the lifetime of HAMR head 330. Additionally, a solid immersion mirror that include a thermally robust metal as a primary material may demonstrate lower deformation (e.g., protrusion, recession) along a media-facing surface of the HAMR head, enabling the solid immersion mirror to be extended closer to the media-facing surface rather than recessed from the media-facing surface to account for such deformation. Such positioning of the solid immersion mirror may provide improved optical coupling and LSP generation on the NFT (e.g., compared to a HAMR head having a recessed solid immersion mirror), potentially improving the performance of the HAMR head.

Benefits provided by a solid immersion mirror that includes a thermally robust metal as a primary material may be unexpected, as such metals may demonstrate more optical loss when compared to other materials that may be used. Specifically, operating temperatures in and proximate the solid immersion mirror may be higher than in similar HAMR heads that include a solid immersion mirror that includes a more optically efficient, but less thermally robust, material (e.g., gold). However, the benefits provided by the thermal stability of a thermally robust metal combined with the ability to place the solid immersion mirror closer to the media-facing surface may exceed the loss from reduced optical efficiency of the thermally robust metal, providing an overall gain in performance when utilizing the thermally robust metal.

In some examples, the thermally robust metal of solid immersion mirror 390 is a noble metal. The thermally robust metal may, for example, be a platinum group metal (e.g., rhodium, iridium, ruthenium, platinum, palladium). In one example, the thermally robust metal of solid immersion mirror 390 is rhodium. Utilizing a noble metal (e.g., a platinum group metal) in solid immersion mirror 390 may reduce oxidation and related defects at elevated temperatures. In some examples, solid immersion mirror 390 includes a thermally robust, noble, platinum group metal having a melting temperature of at least 1800° C. and a thermal conductivity of at least 80 W/mK (e.g., iridium, rhodium, ruthenium, osmium). In one example, solid immersion mirror 390 includes a thermally robust, noble, platinum group metal having a melting temperature of at least 1800° C. and a thermal conductivity of at least 140 W/mK (e.g., iridium, rhodium). In one example, solid immersion mirror 390 includes a thermally robust, noble, platinum group metal having a melting temperature of at least 2200° C. and a thermal conductivity of at least 110 W/mK (e.g., iridium, ruthenium). In one example, solid immersion mirror 390 includes a thermally robust, noble, platinum group metal having a melting temperature of at least 2200° C. and a thermal conductivity of at least 140 W/mK (e.g., iridium).

In accordance with aspects of this disclosure, solid immersion mirror 390 may include a magnetic material. In some examples, the magnetic material is a ferromagnetic material (e.g., FeCo, FeCoNi, FePt, CoCrPt, $SmCo_5$). In some examples, the magnetic material is an antiferromagnetic material (e.g., IrMn, PtMn, MnFe, TbCoFe, NiO, CoO). A magnetic material may be a primary material of solid immersion mirror 390. The magnetic material may, for example, constitute greater than 50 atomic percent of solid immersion mirror 390. In some examples, the magnetic material constitutes at least 95 atomic percent of solid immersion mirror 390 (e.g., 95%, 99%, 99.9%).

Including a magnetic material in solid immersion mirror 390 may enable advantageous magnetic and optical-magnetic designs. For example, some magnetic materials may provide shielding against extraneous magnetic fields (e.g., from bits of data on adjacent tracks of a magnetic disk), potentially enabling improved write capability of HAMR head 330. Some magnetic materials have similar optical properties to other materials (e.g., gold, thermally robust metals such a rhodium and iridium) in the electromagnetic wavelength range of a laser of HAMR head 330, potentially enabling designs of solid immersion mirror 390 that demonstrate similar optical properties to solid immersion mirrors that include other materials (e.g., gold), with added magnetic benefits. Such compositions and designs of solid immersion mirror 390 are contemplated and considered to be within the scope of this disclosure.

Figure 4:
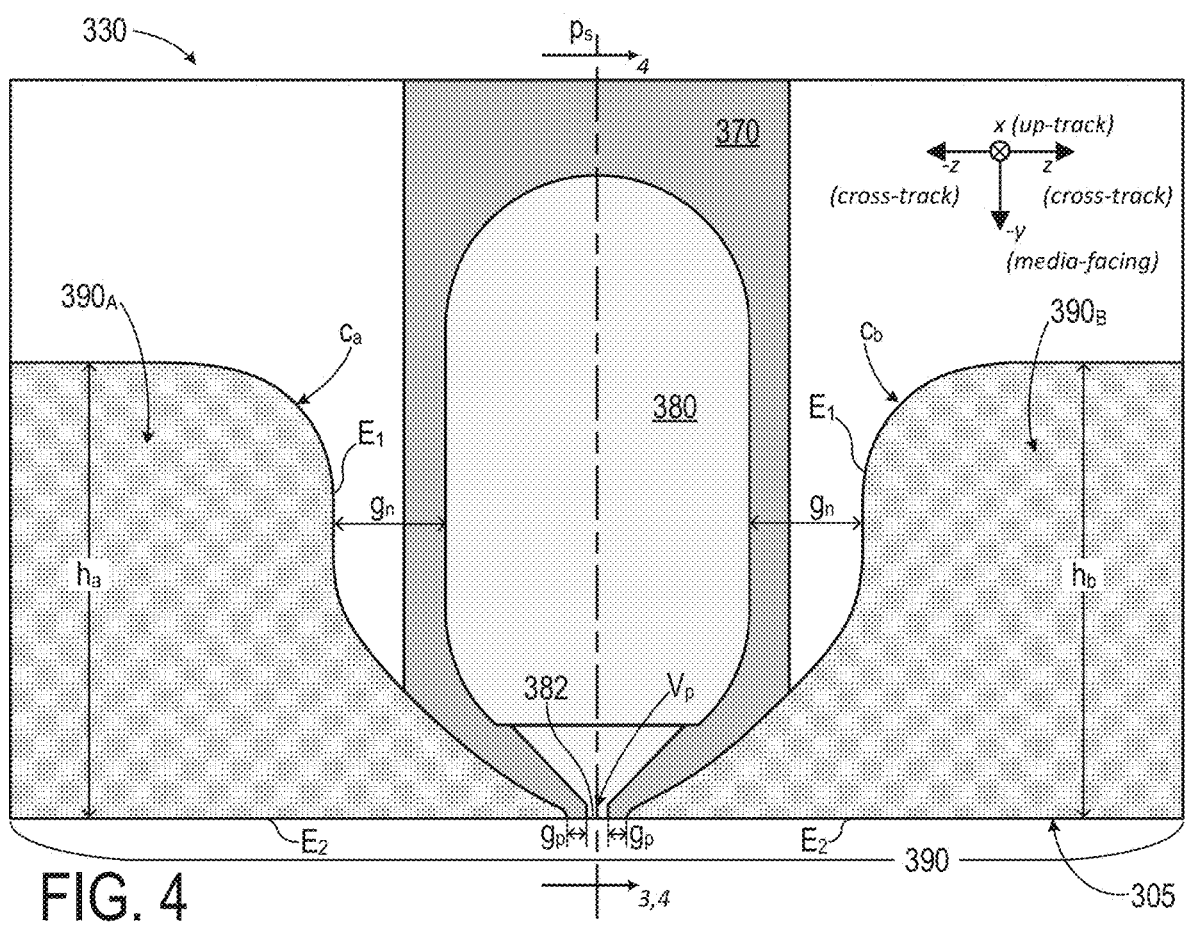
FIG. 4 is a view of an example HAMR head, in accordance with aspects of this disclosure.

FIG. 4 is a view of an example HAMR head, in accordance with aspects of this disclosure. FIG. 4 is a view of HAMR head 330 of FIG. 3 along an up-track x direction. HAMR head 330 of FIG. 4 includes waveguide 370, NFT 380, and solid immersion mirror 390. Solid immersion mirror 390 includes a first segment $390_A$ and a second segment $390_B$ disposed on opposite sides of NFT 380 relative to a cross-track dimension z of HAMR head 330. NFT 380 is divided into substantially symmetric halves by a plane of symmetry $p_s$ that is substantially parallel to a media-facing -y dimension and an up-track x dimension of HAMR head 330. First segment $390_A$ and second segment $390_B$ may be substantially symmetric about plane of symmetry $p_s$.

Each of first segment $390_A$ and second segment $390_B$ has a height $h_a$ and $h_b$, respectively, in a media-facing -y dimension of HAMR head 330. In some examples, height $h_a$ of first segment $390_A$ is substantially the same as height $h_b$ of second segment $390_B$. Each of first segment $390_A$ and second segment $390_B$ includes a first edge $E_1$ and a second edge $E_2$. A part of first edge $E_1$ of each of first segment $390_A$ and second segment $390_B$ faces NFT 380. Parts of first edges $E_1$ that face NFT 380 comprise a profile around a part of NFT 380 when viewed along an up-track x dimension of HAMR head 330. Each first edge $E_1$ is separated from NFT 380 by a gap $g_n$ in the cross-track z dimension. First edge $E_1$ of each of first segment $390_A$ and second segment $390_B$ traces a curvature $c_a$ and $c_b$, respectively, away from NFT 380 and extends substantially parallel to media-facing surface 305 on a side of the respective segment $390_A$ or $390_B$ that is distal to media-facing surface 305. First edge $E_1$ of each of first segment $390_A$ and second segment $390_B$ terminates at a position that is proximal to or coincident with media-facing surface 305. Each of the positions where the first edge $E_1$ of each of the first segment $390_A$ and the second segment $390_B$ terminates is separated from peg 382 of NFT 380 by a gap $g_p$ in a cross-track z dimension of HAMR head 330. In the example of HAMR head 330, each second edge $E_2$ is substantially parallel to media-facing surface 305.

While first segment $390_A$ and second segment $390_B$ may share common identifiers in FIG. 4 for edges $E_1$ and $E_2$, gaps $g_n$ and $g_p$, and other dimensions, it should be understood that the aspects of each of these dimensions or features (e.g., length, shape) are not necessarily identical for first segment $390_A$ and second segment $390_B$. That is, while a common identifier may be used for both segments 390$_A$ and 390$_B$, geometric and/or other variations may exist for the identifier with respect each segment.

Figure 5:
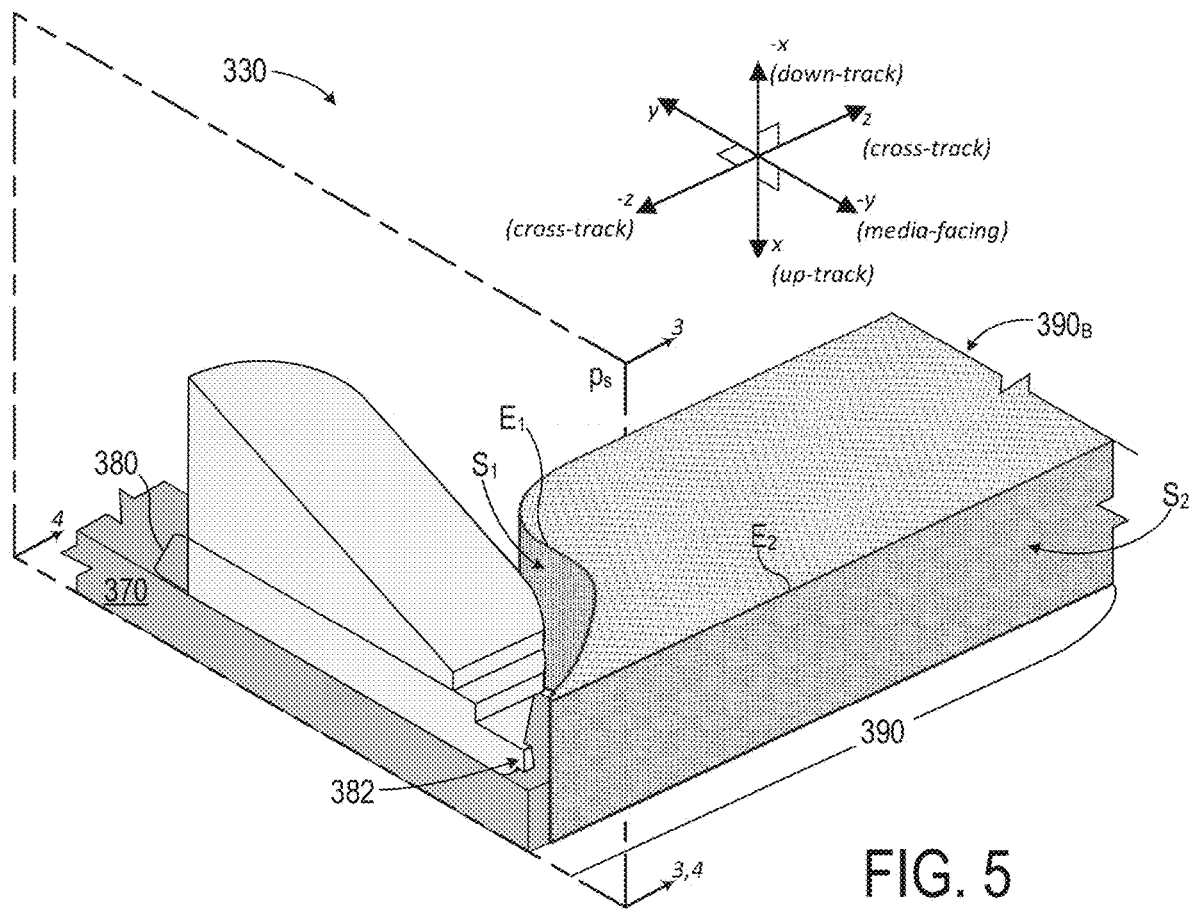
FIG. 5 is a cross-sectional perspective view of an example HAMR head, in accordance with aspects of this disclosure.

FIG. 5 is a cross-sectional perspective view of an example HAMR head, in accordance with aspects of this disclosure. FIG. 5 is a cross-sectional perspective view of HAMR head 330 of FIG. 3 and FIG. 4, with the cross-section taken along the plane of symmetry p$_s$ and the view in the direction of the arrows (3 and 3,4 for FIG. 3 view, 4 and 3,4 for FIG. 4 view). The cross-section illustrated in FIG. 5 shows second segment 390$_B$ of solid immersion mirror 390. However, the description of features and aspects hereinafter also applies to first segment 390$_A$ of FIG. 3 and FIG. 4.

Segment 390$_B$ of solid immersion mirror 390 is elongated in a cross-track z dimension of HAMR head 330. Edge E$_1$ of segment 390$_B$ extends a length in the up-track x dimension of HAMR head 330, the extension of edge E$_1$ defining a first surface S$_1$ of segment 390$_B$. A part of surface S$_1$ faces NFT 380. Edge E$_2$ of segment 390$_B$ extends a length in the up-track x dimension, the extension of edge E$_2$ defining a second surface S$_2$ of segment 390$_B$. Second surface S$_2$ is proximal to or coincident with, and substantially parallel to media-facing surface 305. Second surface S$_2$ may include a thermally robust primary metal and/or a magnetic primary material of solid immersion mirror 390.

Various examples have been presented for the purposes of illustration and description. These and other examples are within the scope of the following claims.

What is claimed is:

1. A heat-assisted magnetic recording head comprising:
a near-field transducer configured to focus and emit an optical near-field;
a waveguide configured to receive electromagnetic radiation and propagate the electromagnetic radiation toward and proximal to the near-field transducer; and
a solid immersion mirror disposed proximal to the near-field transducer and along a media-facing surface of the heat-assisted magnetic recording head,
wherein the solid immersion mirror comprises a first segment and a second segment disposed on opposite sides of the near-field transducer relative to a cross-track dimension of the heat-assisted magnetic recording head,
wherein the solid immersion mirror comprises a thermally robust metal having a melting temperature of at least 1500 degrees Celsius, and
wherein the thermally robust metal is a primary material of the solid immersion mirror.

2. The heat-assisted magnetic recording head of claim 1, wherein the thermally robust metal is a noble metal.

3. The heat-assisted magnetic recording head of claim 2, wherein the noble metal is a platinum group metal.

4. The heat-assisted magnetic recording head of claim 3, wherein the platinum group metal is rhodium.

5. The heat-assisted magnetic recording head of claim 1, wherein the thermally robust metal is a noble, platinum group metal having a melting temperature of at least 1800 degrees Celsius and a thermal conductivity of at least 80 Watts per meter Kelvin.

6. The heat-assisted magnetic recording head of claim 5, wherein the thermally robust metal is a noble, platinum group metal having a melting temperature of at least 1800 degrees Celsius and a thermal conductivity of at least 140 Watts per meter Kelvin.

7. The heat-assisted magnetic recording head of claim 5, wherein the thermally robust metal is a noble, platinum group metal having a melting temperature of at least 2200 degrees Celsius and a thermal conductivity of at least 110 Watts per meter Kelvin.

8. The heat-assisted magnetic recording head of claim 1, wherein the thermally robust metal comprises at least 95 atomic percent of the solid immersion mirror.

9. The heat-assisted magnetic recording head of claim 1,
wherein the near-field transducer is divided into substantially symmetric halves by a plane of symmetry that is substantially parallel to a media-facing dimension and an up-track dimension of the heat-assisted magnetic recording head, and
wherein the first segment and the second segment are substantially symmetric about the plane of symmetry.

10. The heat-assisted magnetic recording head of claim 9,
wherein each of the first segment and the second segment of the solid immersion mirror comprises an edge,
wherein a part of the edge of each of the first segment and the second segment faces the near-field transducer,
wherein the edge of each of the first segment and the second segment is separated from the near-field transducer by a gap,
wherein the part of the edge of each of the first segment and the second segment that faces the near-field transducer comprises a profile around a part of the near-field transducer when viewed along the up-track dimension of the heat-assisted magnetic recording head,
wherein the edge of each of the first segment and the second segment extends a length in the up-track dimension of the heat-assisted magnetic recording head, the extension of the edge of each of the first segment and the second segment defining a surface of each of the first segment and the second segment, respectively, and
wherein at least a part of the surface of each of the first segment and the second segment faces the near-field transducer.

11. The heat-assisted magnetic recording head of claim 10,
wherein the edge of each of the first segment and the second segment is a first edge of the first segment and the second segment, respectively,
wherein the surface of each of the first segment and the second segment is a first surface of the first segment and the second segment, respectively,
wherein each of the first segment and the second segment comprises a second edge that is substantially parallel to the media-facing surface of the heat-assisted magnetic recording head,
wherein each of the second edge of the first segment and the second segment extends a length in the up-track dimension of the heat-assisted magnetic recording head, the extension of each of the second edge of the first segment and the second segment defining a second surface of each of the first segment and the second segment, respectively,
wherein the second surface of each of the first segment and the second segment is proximal to or coincident with, and substantially parallel to the media-facing surface of the heat-assisted magnetic recording head, and
wherein the second surface of each of the first segment and the second segment comprises the thermally robust metal.

12. A heat-assisted magnetic recording head comprising:
a near-field transducer configured to focus and emit an optical near-field;

a waveguide configured to receive electromagnetic radiation and propagate the electromagnetic radiation toward and proximal to the near-field transducer; and a solid immersion mirror disposed proximal to the near-field transducer and along a media-facing surface of the heat-assisted magnetic recording head, wherein the solid immersion mirror comprises a first segment and a second segment disposed on opposite sides of the near-field transducer relative to a cross-track dimension of the heat-assisted magnetic recording head, wherein the solid immersion mirror comprises a magnetic material, wherein the near-field transducer is divided into substantially symmetric halves by a plane of symmetry that is substantially parallel to a media-facing dimension and an up-track dimension of the heat-assisted magnetic recording head, wherein the first segment and the second segment are substantially symmetric about the plane of symmetry, wherein each of the first segment and the second segment of the solid immersion mirror comprises an edge, wherein a part of the edge of each of the first segment and the second segment faces the near-field transducer, wherein the edge of each of the first segment and the second segment is separated from the near-field transducer by a gap, wherein the part of the edge of each of the first segment and the second segment that faces the near-field transducer comprises a profile around a part of the near-field transducer when viewed along the up-track dimension of the heat-assisted magnetic recording head, wherein the edge of each of the first segment and the second segment extends a length in the up-track dimension of the heat-assisted magnetic recording head, the extension of the edge of each of the first segment and the second segment defining a surface of each of the first segment and the second segment, respectively, and wherein at least a part of the surface of each of the first segment and the second segment faces the near-field transducer.

13. The heat-assisted magnetic recording head of claim 12, wherein the magnetic material is a primary material of the solid immersion mirror.

14. The heat-assisted magnetic recording head of claim 12, wherein the magnetic material is a ferromagnetic material.

15. The heat-assisted magnetic recording head of claim 14, wherein the ferromagnetic material includes at least one of FeCo FeCoNi, FePt, CoCrPt, or $SmCo_5$.

16. The heat-assisted magnetic recording head of claim 12, wherein the magnetic material is an antiferromagnetic material.

17. The heat-assisted magnetic recording head of claim 16, wherein the ferromagnetic material includes at least one of IrMn, PtMn, MnFe, TbCoFe, NiO, or CoO.

18. The heat-assisted magnetic recording head of claim 12,
   wherein the edge of each of the first segment and the second segment is a first edge of the first segment and the second segment, respectively,
   wherein the surface of each of the first segment and the second segment is a first surface of the first segment and the second segment, respectively,
   wherein each of the first segment and the second segment comprises a second edge that is substantially parallel to the media-facing surface of the heat-assisted magnetic recording head,
   wherein each of the second edge of the first segment and the second segment extends a length in an up-track dimension of the heat-assisted magnetic recording head, the extension of each of the second edge of the first segment and the second segment defining a second surface of each of the first segment and the second segment, respectively,
   wherein the second surface of each of the first segment and the second segment is proximal to or coincident with, and substantially parallel to the media-facing surface of the heat-assisted magnetic recording head, and
   wherein the second surface of each of the first segment and the second segment comprises the magnetic primary material.

* * * * *